J. F. NETTLE.
ROTARY ENGINE.
APPLICATION FILED JAN. 22, 1913.
1,066,309. Patented July 1, 1913.
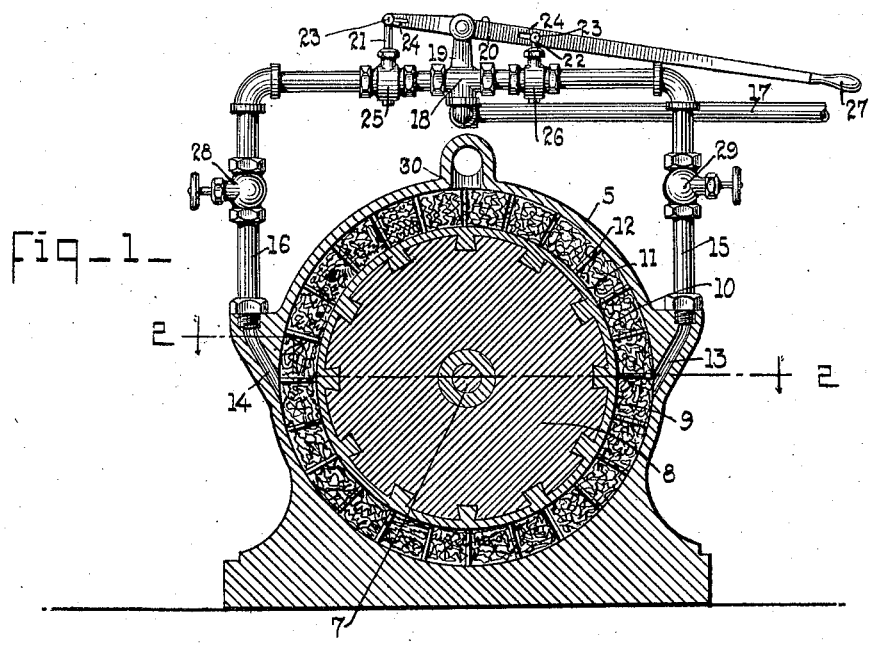
Fig-1-
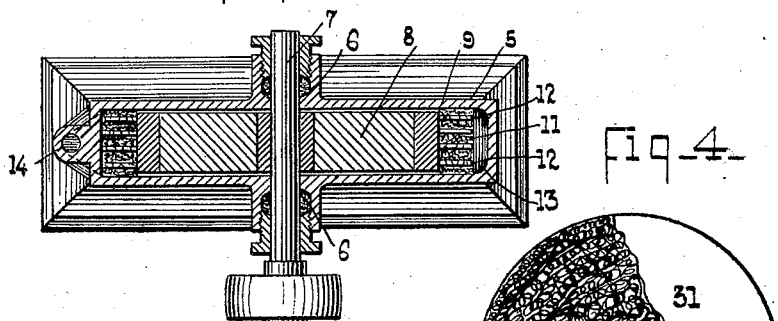
Fig-2-
Fig-4-
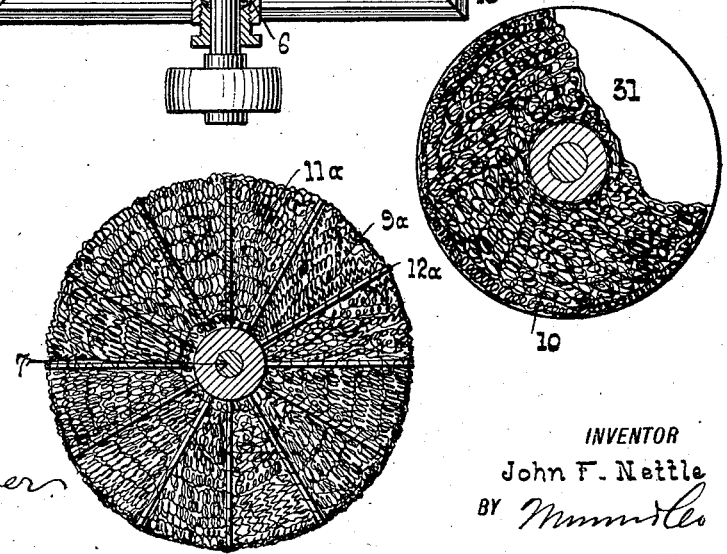
Fig-3-
WITNESSES
Frank C Palmer
E. B. Marshall
INVENTOR
John F. Nettle
BY
ATTORNEYS

UNITED STATES PATENT OFFICE.

JOHN F. NETTLE, OF BUTTE, MONTANA.

ROTARY ENGINE.

1,066,309.  Specification of Letters Patent.  Patented July 1, 1913.

Application filed January 22, 1913. Serial No. 743,574.

*To all whom it may concern:*

Be it known that I, JOHN F. NETTLE, a citizen of the United States, and a resident of Butte, in the county of Silverbow and State of Montana, have invented a new and Improved Rotary Engine, of which the following is a full, clear, and exact description.

My invention has for its object to provide a rotary engine with a cylindrical member covered with bent and matted wire members, which are referred to as wire wool, the wire members fitting snugly against the casing in which the cylindrical member is disposed for rotating. The motor may be constructed at little expense, and as the fluid under pressure is directed against the matted wire wool at the casing, the openings in the matted wire wool make it possible for the fluid under pressure to expand a considerable degree in a comparatively small space.

Additional objects of the invention will appear in the following complete specification, in which the preferred form of the invention is disclosed.

In the drawings similar characters of reference indicate corresponding parts in all the views, in which—

Figure 1 is a transverse sectional elevation of the rotary engine; Fig. 2 is a sectional view on the line 2—2 of Fig. 1; Fig. 3 is a side elevation of a modified form of a rotating member. Fig. 4 is a modified form of the invention.

By referring to the drawings it will be seen that a casing 5 is provided having bearings 6, in which is journaled a shaft 7, to which is keyed the cylindrical member 8, which is disposed within the casing 5. As will be seen by referring to the drawings the periphery 9 of this cylindrical member 8 is spaced from the casing 5, so that the bent wire members 11, which are referred to as wire wool, and which are secured to the cylindrical member 8, may be disposed between the cylindrical member 8 and the casing 5 to act as buckets. This wire wool 11, constructed of bent and matted wire members, is held to the cylindrical member 8 by the radially disposed rods 12, which are secured to the cylindrical member 8, and which project therefrom.

The casing 5 has two inlets 13 and 14, to which are connected the branch pipes 15 and 16, these branch pipes 15 and 16 being fed by a main pipe 17. To the coupling 18, which connects the main pipe 17 with the branch pipes 15 and 16, there is secured a bracket 19, to which is fulcrumed a lever 20, this lever 20 having valve rods 21 and 22, which have members 23 disposed for sliding in the slots 24 in the lever 20. The valve rod 21 commands the valve 25 in the branch pipes 16, and the valve rod 22 commands the valve 26 in the branch pipe 15. It will therefore be seen that when the handle 27 of the lever is raised, the valve 25 will be closed, and the valve 26 will be opened, while when the handle 27 of the lever is pressed downward, the valve 26 will be closed, and the valve 25 will be opened. The branch pipe 16 has an additional hand valve 28, and the branch pipe 15 has an additional hand valve 29.

The casing 5 is provided with an exhaust 30. When the lever 20 is in the position shown in Fig. 1 of the drawings, and with the valve 25 open, the steam or other fluid under pressure will pass from the main pipes 17 to the branch pipe 16, and through the inlet pipe 14 in the casing 5. This steam or other fluid under pressure will strike against the wire wool members 11 which are disposed at the casing 5, and will rotate the wire wool members 11, with the shaft 7 as their axis, and with them the cylindrical member 8 and the shaft 7.

As the steam or other fluid under pressure passes down and to the right, it will expand inward, and will act on the wire members 11 not only at the casing 5, but also all the way inward to the periphery 9 of the cylindrical member 8, the expanded steam passing from the cylinder 5 to the exhaust port. By raising the handle 27 of the lever 20, the steam will be introduced to the branch 15, instead of the branch 16, and the steam will pass from the inlet port 13 to the wire wool members 11, and will guide the wire wool members and the cylindrical member 8 and the shaft 7 in the same way as is the case when the steam enters the port 14, but with the result that the cylindrical member 8 and the shaft 7 will be rotated in opposite directions.

In the modified form of the invention shown in Fig. 3 of the drawings, there is a relatively small cylindrical member 9$^a$, and the rods 12$^a$ are much longer than the rods 12, shown in Fig. 1 of the drawings. With this construction a greater thickness of wire wool 11$^a$ is disposed around the cylindrical member 9$^a$, and with this construction a greater expansion of steam is permitted, since should the steam be directed against the periphery of the wire wool 11ᵃ, it will at first only act on the outer side of the wire wool 11ᵃ, while as the cylindrical member 9ᵃ rotates, the steam will expand, and will act on the wire wool at points nearer the cylindrical member 9ᵃ. In the construction shown in Fig. 4, the wire wool is secured to each side of the disk 31 to accomplish the results referred to in connection with the other constructions.

Having thus described my invention I claim as new and desire to secure by Letters Patent:

1. In a rotary engine, a member, a second member adapted to move relatively to the first member, an exhaust in the first member, an inlet port in the first member, and spaced from the exhaust for feeding steam in the direction of the exhaust, and matted wire secured to the second member, the matted wire substantially filling the space between the first and the second members, and permitting the expansion of the steam in the direction of the exhaust.

2. In a rotary engine, a casing, a member for rotating in and spaced from the casing, there being an exhaust in the casing, and an inlet port in the casing disposed at a distance from the exhaust, the exhaust and the inlet being positioned in the casing in the said space between the casing and the member, and matted wire secured to the member and substantially filling the said space for receiving the steam from the inlet for rotating the member under the steam pressure, while permitting the steam to expand in the direction of the exhaust.

3. In a rotary engine, a casing, a member for rotating in and spaced from the casing, there being an exhaust in the casing, and an inlet port in the casing disposed at a distance from the exhaust, the exhaust and the inlet being positioned in the casing in the said space between the casing and the member, and a mass of members having openings and substantially filling the said space, the mass of members being secured to the member for receiving steam from the inlet for rotating the member under the steam pressure, while permitting the steam to expand in the direction of the exhaust.

In testimony whereof I have signed my name to this specification in the presence of two subscribing witnesses.

JOHN F. NETTLE.

Witnesses:
GEORGE HOOPER,
JOHN EVANS.

---

Copies of this patent may be obtained for five cents each, by addressing the "Commissioner of Patents, Washington, D. C."